(12) United States Patent
Wang et al.

(10) Patent No.: US 11,506,510 B1
(45) Date of Patent: Nov. 22, 2022

(54) METHOD AND SYSTEM FOR IDENTIFYING CONFIDENCE LEVEL OF AUTONOMOUS DRIVING SYSTEM

(71) Applicant: Zhiji Automotive Technology Co., Ltd., Shanghai (CN)

(72) Inventors: Weilong Wang, Shanghai (CN); Tao Liu, Shanghai (CN); Jinpeng He, Shanghai (CN)

(73) Assignee: Zhiji Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 17/550,325

(22) Filed: Dec. 14, 2021

(30) Foreign Application Priority Data

Jun. 9, 2021 (CN) .......................... 202110639631.8

(51) Int. Cl.
  *G01C 21/36* (2006.01)
  *G01C 21/00* (2006.01)
  *G01C 21/34* (2006.01)

(52) U.S. Cl.
  CPC ....... *G01C 21/365* (2013.01); *G01C 21/3484* (2013.01); *G01C 21/3492* (2013.01); *G01C 21/3889* (2020.08)

(58) Field of Classification Search
  None
  See application file for complete search history.

(56) References Cited

U.S. PATENT DOCUMENTS

| 2015/0112571 | A1 | 4/2015 | Schmüdderich | |
| 2016/0026180 | A1* | 1/2016 | Tsimhoni | G05D 1/0061 701/23 |

(Continued)

FOREIGN PATENT DOCUMENTS

| CN | 104057956 A | 9/2014 |
| CN | 105320128 A | 2/2016 |

(Continued)

OTHER PUBLICATIONS

The State Intellectual Property Office of People's Republic of China, First Office Action in Patent Application No. CN202110639631.8 dated Aug. 23, 2021, which is a foreign counterpart application corresponding to this U.S. Patent Application, to which this application claims priority.

(Continued)

*Primary Examiner* — Yuen Wong
*Assistant Examiner* — Hongye Liang
(74) *Attorney, Agent, or Firm* — Kolitch Romano Dascenzo Gates LLC

(57) ABSTRACT

The present disclosure provides a method for identifying a confidence level of an autonomous driving system in an autonomous driving vehicle. The method includes determining hardware currently used by the autonomous driving system to realize required functions and environmental factors which affect the hardware capability of the hardware, and establishing a relationship between the hardware capability and the environmental factors; based on environmental factors on a future specific road section acquired in real time, calculating a degree to which the hardware capability will be affected on the specific road section; in consideration of acquired the environmental factors, judging an influence of the affected hardware capability on the realization of required functions of the autonomous driving system based on the acquired the environmental factors; and reflecting the influence on the realization of required functions of the autonomous driving system as a confidence level, and prompting the confidence level to a driver.

20 Claims, 1 Drawing Sheet

(56) References Cited

U.S. PATENT DOCUMENTS

| | | | |
|---|---|---|---|
| 2017/0212515 A1 | 7/2017 | Bertollini et al. | |
| 2017/0248951 A1* | 8/2017 | Perkins | B60W 50/082 |
| 2017/0291615 A1 | 10/2017 | Kusano et al. | |
| 2018/0059661 A1 | 3/2018 | Sato et al. | |
| 2019/0351899 A1 | 11/2019 | Adam et al. | |
| 2020/0180650 A1 | 6/2020 | Lee et al. | |

FOREIGN PATENT DOCUMENTS

| | | |
|---|---|---|
| CN | 110174856 A | 8/2019 |
| CN | 110998470 A | 4/2020 |
| CN | 111976727 A | 11/2020 |
| EP | 2940545 A1 | 4/2015 |
| EP | 2915718 A1 | 9/2015 |
| EP | 3291197 A1 | 3/2018 |

OTHER PUBLICATIONS

The State Intellectual Property Office of People's Republic of China, Second Office Action in Patent Application No. CN202110639631.8 dated Sep. 10, 2021, which is a foreign counterpart application corresponding to this U.S. Patent Application, to which this application claims priority.
Notification to Grant Patent Right for Invention for CN202110639631.8 dated Oct. 8, 2021.
European Search Report Communication Pursuant to Rule 62 EPC, dated Jun. 7, 2022 in Patent Application No. EP21216972, which is a foreign counterpart application to which this application claims priority.

\* cited by examiner

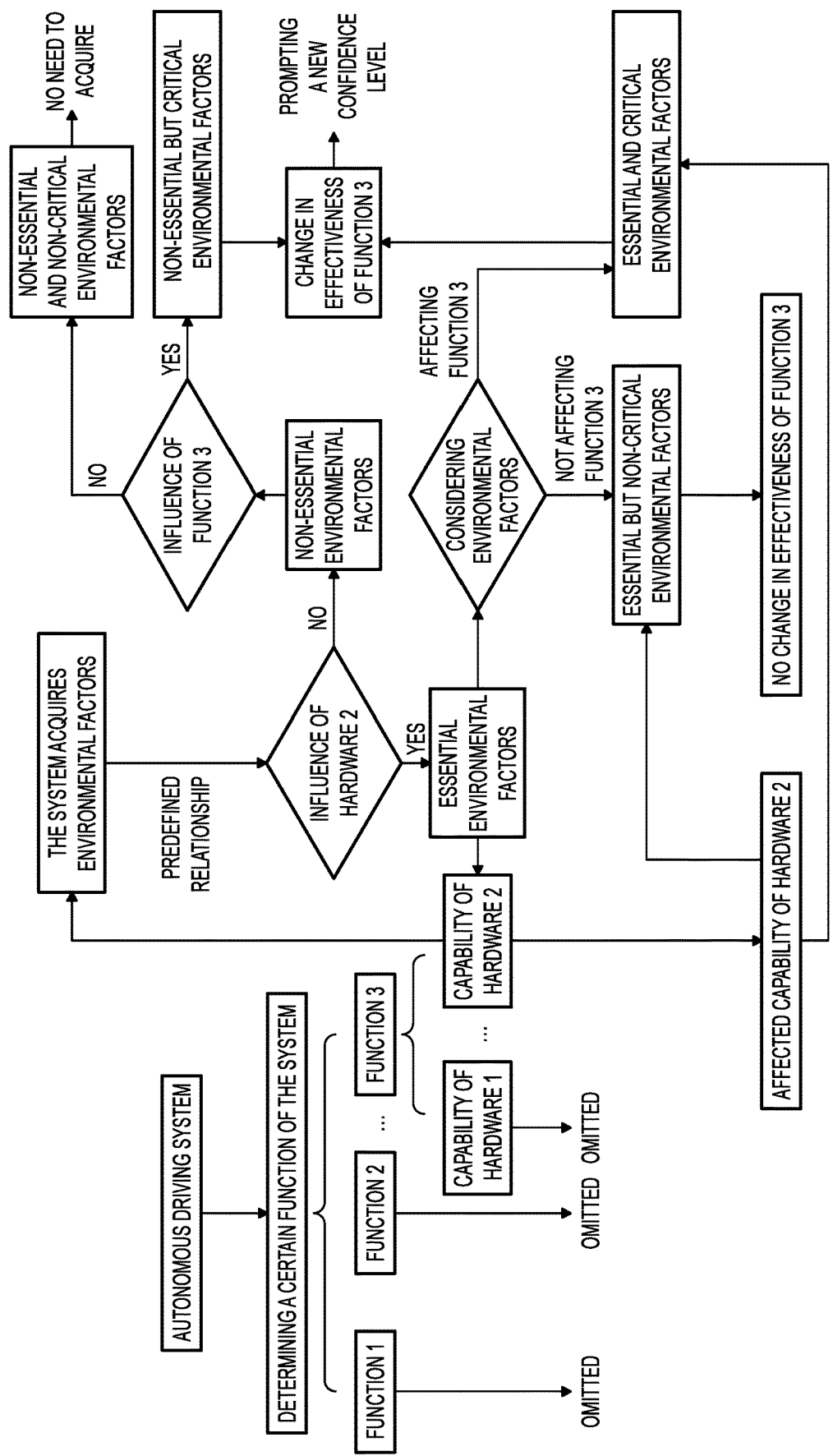

METHOD AND SYSTEM FOR IDENTIFYING CONFIDENCE LEVEL OF AUTONOMOUS DRIVING SYSTEM

TECHNICAL FIELD

The present disclosure relates to a method and system for identifying a confidence level of an autonomous driving system.

BACKGROUND

An autonomous vehicle is a vehicle which can sense its environment and navigate without human input and is equipped with an autonomous driving system. The autonomous driving system is a highly centralized control operation system where the work executed by a human driver is fully or partly automated. The autonomous driving system usually has a plurality of functions, such as automatic wake-up activation and sleeping function, automatic parking lot entry/exit function, automatic cleaning function, automatic driving function, automatic parking function, automatic vehicle door opening/closing function and automatic fault recovery function. In addition, the autonomous driving system has a plurality of operation modes, such as normal operation, downgrade operation and operation interruption, in order to realize system optimization and energy saving.

Through functional safety design, a certain function of the autonomous driving system can sense the current situation in real time and/or realize the software and hardware capability for realizing the function in real time. For example, within a range of operation design domain (ODD), input parameters of sensors are processed and compared with preset threshold values. Predefined actions will be performed if the preset threshold values are reached. In case of a system failure or a failure beyond the scope of operation design domain, the vehicle will perform actions according to pre-defined corresponding functional safety measures, such as issuing alert information, and a display such as a display of an human machine interaction (HMI) display will preferentially display information with a high weight according to pre-defined weights of the alert information, in order to ensure a safe operation.

Generally speaking, by comparing the sensed parameters from the sensors of the vehicle with predefined parameters, if the sensed parameters are within a predefined range, the certain function would be effective, but if the sensing parameters are beyond the predefined range, the certain function would be ineffective. However, this method can only sense and cope with those hardware and software faults and system failures that have already occurred, it neither can predict in advance a possibility of the failure of the autonomous driving system in the future, nor can inform the driver of the possibility of the failure of the autonomous driving system in the future, which often causes the driver to panic in the face of a sudden functional failure or system failure during driving, and can greatly compromise the autonomous driving experience.

SUMMARY

In view of the above problems, an objective of the present disclosure is to provide a method and system for identifying a confidence level of an autonomous driving system, which can predict in advance a possibility of the failure of the autonomous driving system in the future and alert a drive on the possible failure.

The present disclosure provides a method for identifying a confidence level of an autonomous driving system. The method comprises:

determining hardware used by the autonomous driving system currently to realize required functions and environmental factors which affect the hardware capability of the hardware, and establishing a relationship between the hardware capability of the hardware and the environmental factors;

based on environmental factors on a future specific road section acquired in real time through an automatic indexing technology and/or a data processing and extraction technology, calculating a degree to which the hardware capability of the hardware will be affected on the specific road section according to the relationship;

in consideration of the environmental factors, judging an influence of the affected hardware capability on the realization of required functions of the autonomous driving system, and reflecting the influence on the realization of required functions of the autonomous driving system as a confidence level of the autonomous driving system, and prompting the confidence level to a driver.

Optionally, in the present disclosure the method further comprises:

based on whether the environmental factors affect the hardware capability of the hardware, the environmental factors are set as essential environmental factors and non-essential environmental factors for the hardware;

based on whether the essential environmental factors affect the realization of required functions of the autonomous driving system, the essential environmental factors are further set as essential and critical environmental factors and essential but non-critical environmental factors for the functions, based on whether the non-essential environmental factors affect the realization of required functions of the autonomous driving system, the non-essential environmental factors are further set as non-essential but critical environmental factors and non-essential and non-critical environmental factors for the functions.

Optionally, in the present disclosure, the environmental factors acquired in real time through the automatic indexing technology and/or the data processing and extraction technology include at least essential environmental parameters which can be directly used for calculating the hardware capability of the hardware, and essential environmental factors which can be used for the calculation only after being processed and converted into essential environmental parameters.

Optionally, in the present disclosure, corresponding relationships between performance parameters reflecting the hardware capability of the hardware and environmental parameters reflecting the essential environmental factors are determined and established.

Optionally, the method of the present disclosure comprises: based on the acquired essential environmental parameters directly and the essential environmental parameters acquired after processing the essential environmental factors, the performance parameters of the hardware are calculated, respectively, according to the corresponding relationships, and the affected hardware capability of the hardware is deduced based on the performance parameters of the hardware.

Optionally, in the present disclosure, the affected hardware capability of the hardware is compared with the current hardware capability of the hardware or a specified threshold value; if the affected hardware capability is above the current hardware capability or the specified threshold value, it is judged that the hardware capability of the hardware will not be affected on the future specific road section, and if the affected hardware capability is lower than the current hardware capability or the specified threshold value, it is judged that the hardware capability of the hardware will be restricted on the future specific road section.

Optionally, in the present disclosure, the method comprises: when the hardware capability of the hardware will be restricted on the future specific road section, in consideration of the environmental factors, if it is judged that the essential environmental factors are the essential and critical environmental factors, the hardware capability of the hardware being restricted will negatively affect the realization of required functions of the autonomous driving system, and the confidence level of the autonomous driving system will decline, and the degree of the decline corresponds to the affected hardware capability of the hardware; and if the essential environmental factors are the essential but non-critical environmental factors, the hardware capability of the hardware being restricted will not negatively affect the realization of required functions of the autonomous driving system, and the confidence level of the autonomous driving system will not decline.

Optionally, in the present disclosure, the non-essential but critical environmental factors on the specific road section are also acquired in real time through the automatic indexing technology and/or the data processing and extraction technology.

Optionally, in the present disclosure, the non-essential but critical environmental factors on the specific road section are captured in real time through the automatic indexing technology and extracted in real time through the data processing and extraction technology, if the acquisition succeeds, it indicates that factors which directly affect the realization of specific functions of the autonomous driving exist on the future road section, and it is directly determined that the realization of the required functions the autonomous driving system will be negatively affected, and the confidence level of the autonomous driving system declines; and if the acquisition has failed, it indicates that factors which directly affect the realization of specific functions of the autonomous driving system do not exist on the future road section.

Optionally, in the present disclosure, relevant information indicating the confidence level of the autonomous driving system is output to the driver through an output device on the autonomous vehicle.

Optionally, in the present disclosure, the relevant information regarding the confidence level of the autonomous driving system includes at least the confidence level of the autonomous driving system on the specific road section, and pre-estimated time and distance needed to arrive at the specific road section.

In another aspect, the present disclosure provides an autonomous driving system capable of identifying its confidence level. The autonomous driving system includes one or more processors and one or more memories for storing instructions, wherein the instructions, when being executed by the processors, cause the autonomous driving system to perform the following operations:

determining hardware used by the autonomous driving system currently to realize required functions and environmental factors which affect the hardware capability of the hardware, and establishing a relationship between the hardware capability of the hardware and the environmental factors;

based on environmental factors on a future specific road section acquired in real time through an automatic indexing technology and/or a data processing and extraction technology, calculating a degree to which the hardware capability of the hardware will be affected on the specific road section according to the relation;

in consideration of the environmental factors, judging an influence of the affected hardware capability of the hardware on the realization of required functions of the autonomous driving system, and reflecting the influence on the realization of required functions of the autonomous driving system as a confidence level of the autonomous driving system, and prompting the confidence level to a driver.

In yet another aspect, the present disclosure provides an autonomous vehicle. The automatic vehicle includes the above autonomous driving system.

In yet another aspect, the present disclosure provides a controller. The controller includes a memory and a processor, wherein the memory stores at least one instruction, at least one program, a code set or an instruction set which are loaded and executed by the processor to carry out the above method for identifying a confidence level.

In yet another aspect, the present disclosure provides a non-transitory computer readable storage medium. The storage medium stores at least one instruction, at least one program, a code set or an instruction set which are loaded and executed by the processor to carry out the above method for identifying a confidence level.

The method and system of present disclosure provide the following: based on the required functions of the autonomous vehicle, pre-identifying and processing essential environmental factors within a certain range in front of an autonomous vehicle; and estimating the variation degree of the hardware capability by considering multidimensional information sources and the capability constraints of the hardware, analyzing the confidence level of the autonomous driving system or the autonomous driving system. The confidence level reflects/indicates the degree of the confidence that the autonomous driving system will work effectively in a certain operation environment in the future. In some embodiments, information on the confidence level is shown to the driver (e.g., any appropriate device shows the confidence level or information relevant to the confidence level to the driver) so that the drive is aware of the effectiveness system function in a certain period of time in the future, and make preparations accordingly in advance. For example, if the confidence level is high, the driver can relax attention properly, but if the confidence level is low, the driver can be prepared to pay more attention on the driving in advance, so as to avoid the situation where the driver is at a loss when confronted with a sudden function fault or changed function of the hardware/system due to environmental factors.

BRIEF DESCRIPTION OF THE DRAWINGS

FIG. 1 is a flow chart of a method for identifying a confidence level of an autonomous driving system in accordance with the present disclosure.

DETAILED DESCRIPTION

The present disclosure is further described below in combination with the following embodiments. It should be understood that the following embodiments are merely intended to illustrate the present disclosure, rather than limiting the present disclosure. All other embodiments as acquired by those of ordinary skill in the art without creative labor shall be within the scope of protection of the present disclosure. In the figures, the same or similar reference numeral denotes the same component, and repetitive descriptions are omitted. In addition, fusion and others as mentioned in the present disclosure may be technical means already publicly disclosed in the art, and elaborations on their working principles are omitted due to involving no key points and presenting no realization obstacles for those of ordinary skill in the art.

Disclosed in the present disclosure is a method for identifying a confidence level of an autonomous driving system, which can predict in advance a possibility of the impaired condition or fault of an autonomous driving system in the future. FIG. 1 is a flow chart of a method for identifying a confidence level of an autonomous driving system in accordance with the present disclosure. The method may be implemented by an autonomous driving system in an autonomous vehicle. In the present disclosure, the autonomous vehicle may perform various vehicle actions based on the autonomous driving system in a driverless driving mode, such as driving, navigation and operation. The autonomous driving system (also referred to as the system in some embodiments of the present disclosure) may include a control system and various subsystems. By way of interfusion (e.g., combined use) of various hardware carried by the autonomous vehicle, the autonomous driving system realizes various functions. For examples, the functions may include an adaptive cruise control (ACC) function for constant speed vehicle following, a lane keeping assist (LKA) function for assisting the driver to keep the vehicle driving within the lane line, an autonomous driving emergency braking (AEB) function for identifying collision risks and avoiding collisions. When the autonomous driving system performs these functions, a confidence level associated with each function will be determined. The confidence level may be, for example, a numerical value, a percentage and a range, which indicates a degree of confidence of the autonomous driving system regarding its determined motion/action plan over a certain period in the future, and is affected by external environment conditions (such as weather and location/movement of objects), vehicle conditions (e.g., the vehicle's knowledge of map data related to specific geographic areas) and/or other conditions.

In some embodiments, the autonomous vehicle in the present disclosure may be an autonomous driving ground vehicle, such as a car, a truck and a bus, or other types of vehicles, and may operate with minimal and/or no interaction with a human driver. The autonomous vehicle is at least equipped with a vehicle control system and an autonomous driving system (e.g., as software, combination of software/hardware, etc.) and is at least equipped with one or more sensors (e.g., a laser radar, a millimeter wave radar, a camera, etc.) as hardware, and may collect sensor data such as image data, millimeter wave radar data, lidar data, and so on.

In addition to the sensor data, the autonomous driving system may retrieve, automatically index, process and extract, or otherwise acquire environmental data (environmental factors) related to autonomous vehicle driving. The environmental data at least includes map related information: identifiers and locations of different roads, road sections, buildings or other items; locations and directions of traffic lanes, such as boundaries, locations and directions of parking lanes, turning lanes, bicycle lanes or other lanes for specific modes of travel; traffic control data, such as locations and indications of road signs, traffic lights or other traffic control devices; and/or any other map data which provides information to assist the system in understanding and sensing its surroundings and relevant relationship. In addition, the environmental data also includes at least weather-related information: highest temperature, lowest temperature, wind direction, wind force, air quality index, air quality grade, air humidity, illuminance, rainfall, fog, dust storm, rainstorm, and visibility.

Referring to FIG. 1, the method may first determine a realization scheme for a certain function of the autonomous driving system. When the autonomous driving system realizes the certain function, the realization needs an assistance from hardware capability of one hardware device alone or of more hardware devices through hardware fusion (e.g., the combined use of various hardware). As examples, the hardware capability of the autonomous driving system may include steering of a wheel, braking of a brake, acceleration of an accelerator, shooting of a camera, sensing of a radar and flickering/flashing of car lights. The system requires different hardware devices to realize difference functions, while different hardware devices will be affected to different degrees by the environmental factors (hardware device is also referred to as hardware in the present disclosure). Therefore, it is necessary to first determine the realization scheme used by the autonomous driving system for a certain function currently (i.e., the realization scheme used by the current autonomous driving system) in order to determine one or more hardware devices used to realize the required function; and then for each hardware device used, determine a relationship between the hardware capability and the environmental factors. In the illustrated example in FIG. 1, the method may determine a realization scheme involves function 3 among various functions (e.g., function 1, function 2 and function 3). The method may determine that one hardware (e.g., hardware 2 for example) is needed to realize the function 3 and the hardware capability of the determined hardware is evaluated (e.g., the hardware capability of the hardware 2). The realization scheme of the autonomous driving system for a certain specific function may be predefined. For example, the function 3 is automatic parking function and the autonomous vehicle may realize the automatic parking function through hardware 2 which are hardware devices such as vehicle sensors and a steering system.

Then, according to predefined rules, the environmental factors are classified and set for each determined/confirmed hardware to determine whether the environmental factors will have an influence on the hardware. FIG. 1 further illustrates how the environmental factors are classified based on their influence on the hardware (hardware 2 is used as an example). Specifically, those environmental factors which do not affect the hardware capability of the hardware will be set as non-essential environmental factors, and those environmental factors which affect the hardware capability of the hardware will be set as essential environmental factors. In the illustrated example, the method acquires the environmental factors and then determine whether the environmental factors will affect the hardware capability of the hardware 2. If there is no influence, the environmental factors are classified as non-essential environmental factors for the hardware 2. If there is an influence, the environmental factors are classified as essential environmental factors for the hardware 2. In one example, in order to realize the automatic parking function, the autonomous driving system needs to use hardware devices such as the vehicle sensors and the steering system. That is, the determined hardware includes the vehicle sensors and the steering system. In this case, environmental factors such as illuminance and visibility have almost no effect on the hardware capability (i.e., performance) of the steering system, and may be classified as the non-essential environmental factors of the steering system. However, environmental factors such as the wetness, slippiness level and flatness of a road significantly affect the hardware capability (i.e., performance) of the steering system, and may be classified as the essential environmental factors of the steering system. In contrast, the environmental factors such as illuminance and visibility significantly affect the hardware capability (i.e., performance) of the vehicle sensors, and may be classified as the essential environmental factors of the vehicle sensor. However, the environmental factors such as the wetness, slippiness level and flatness of the road have almost no effect on the hardware capability (i.e., performance) of the vehicle sensors, and may be classified as the non-essential environmental factors of the vehicle sensors. In other words, the hardware used for each function is judged separately, and then the environmental factors of each used hardware are judged separately for each hardware device. The determination of the influence and classification of the environmental factors may be performed according to the predefined rules in the system, which may be acquired through manual-definition or experiments.

Then, according to the predefined rules, regarding a system function to be realized, considering the environmental factors, the essential environmental factors are set again. Referring to FIG. 1, the method may determine whether the essential environmental factors are critical based on the acquired environmental factors. That is, the essential environmental factors are further classified by considering or based on the influence of the environmental factors. The essential environmental factors which do not affect the realization of the function under the influence of the environmental factors are set as essential but non-critical environmental factors, that is, the essential but non-critical environmental factors affect the hardware capability but do not affect the system function. The essential environmental factors which affect the realization of the function under the influence of the environmental factors are set as essential and critical environmental factors. For example, the autonomous driving system needs to use hardware such as the vehicle sensors to realize the adaptive cruise control function. In this case, under the influence of environmental factors such as expressway road sections, though the environmental factors such as illuminance and visibility affect the hardware capability of the vehicle sensors, these environmental factors have a relatively small influence on the adaptive cruise control function as a whole since there is no pedestrian on the road. Therefore, the environmental factors such as illuminance and visibility become essential but non-critical environmental factors of the system function due to the environmental factors such as expressway road sections. In contrast, under the influence of environmental factors such as urban road sections, the environmental factors such as illuminance and visibility affect the hardware capability of the vehicle sensors and also the adaptive cruise control function, because when there are many pedestrians on the urban road and the affected hardware capability of the vehicle sensor will likely cause the adaptive cruise control function as a whole to be affected. Therefore, the environmental factors such as illuminance and visibility become the essential and critical environmental factors of the system function due to the environmental factors such as urban road sections. Again, the setting may be carried out according to predefined rules in the system, which may be acquired through manual/artificial definition or experiments.

Then, according to the predefined rules, regarding a system function to be realized, the non-essential environmental factors are screened and set again. For example, referring to FIG. 1, the method determines whether non-essential environmental factors are critical based on their influence on the realization of the function (e.g., function 3 in FIG. 1) as well as the influence of the acquired environmental factors. The non-essential environmental factors which do not affect the realization of the function are set as non-essential and non-critical environmental factors. The non-essential environmental factors which affect the realization of the function are set as non-essential but critical environmental factors, in other words, not affecting the hardware capability but affecting the system function. For example, the autonomous driving system needs to use hardware such as the vehicle sensors to realize the autonomous driving navigation function. In this case, under the influence of environmental factors such as submarine tunnels or strong magnetic fields, though environmental factors such as street lighting facilities and road conditions do not affect the hardware capability of the vehicle sensors, the street lighting facilities and road conditions may still affect the autonomous driving navigation function as a whole due to unstable signal transmission or even no signal, and therefore these environmental factors are non-essential but critical environmental factors of the system function. In the case that the system acquires the non-essential but critical environmental factors on a specific road section in the future, it indicates that these factors will directly affect the realization of the specific function of the autonomous driving system, and it can be directly determined that the realization of the function will be negatively affected. In the example illustrated in FIG. 1, under some conditions, the method may determine that the effectiveness on the realization of the function (function 3 in this example) is affected or changed upon acquiring the non-essential but critical environmental factors. Again, the setting may be carried out through predefined rules in the system, which may be acquired through manual definition or experiments.

Then, hardware capability for the specific function may be determined. For example, the hardware capability of the hardware 2 is determined. In some embodiments, based on movement information or V2X information (information from vehicle to everything (V2X) technology), environmental data (environmental factors) related to essential environmental factors on a specific road section a certain distance away may be identified or acquired. In some examples, the technologies include automatic indexing or data processing and extraction. Automated indexing is the process of assigning and arranging index terms without human intervention. In one example, the automatic indexing may be web crawler technology. It should be appreciated that the environmental data/environmental factors may be acquired or obtained through any appropriate technologies. To reduce the amount of information processing, environmental data related to non-essential and non-critical environmental factors may not be acquired for processing, however, it is not limited in the embodiments of the present disclosure. The environmental data acquired by the system includes the essential environmental parameters which can be directly used for calculating the hardware capability of the hardware based on corresponding relationships and the essential environmental factors which can be used for the calculation only after being processed and converted into essential environmental parameters. In some embodiments, the essential environmental parameters includes, for example, illuminance, rainfall per minute, air humidity, etc. The essential environmental factors include, for example, ambient illumination, time, position, tunnel information (e.g., acquired through a map), weather (e.g., acquired through an APP), street lighting facilities (e.g., acquired through V2X), etc. These essential environmental factors may be converted into essential environmental parameters through predefined conversion rules. For example, essential environmental factors such as air temperature, humidity and position acquired in real time may be converted into a road braking coefficient through a known algorithm.

Then, according to predefined rules, corresponding relationships between performance parameters and environmental parameters are established, that is, the influence of the essential environmental parameters on the hardware capability of the hardware is determined. The performance parameters reflect or indicate the hardware capability and the environment parameters reflect or indicate the essential environmental factors. The predefined rules may be acquired through functional experiments. For example, through experimental testing, it may be determined that the degree of the influence of the road braking coefficient as an essential environmental parameter on the performance parameters of braking system exhibits a linear inverse proportional relationship (this relationship is only an example, and the experiment results depend on the specific performance of the vehicle). In this way, the system may acquire the essential environmental parameters based on the environmental data acquired in real time, calculate the performance parameters of the affected hardware according to the corresponding relationships, and deduce the affected hardware capability of the hardware based on the performance parameters, so as to determine the degree to which the hardware capability will be affected on a specific road section on which the vehicle may drive in the future. In the example illustrated in FIG. 1, the method may determine the affected hardware capability of the hardware 2.

Then, the affected hardware capability of the hardware is compared with the current hardware capability of the hardware or a specified threshold value. In the case that the affected hardware capability is above/higher than the current hardware capability, it is determined that the hardware capability of the hardware will not be affected on the specific road section on which the vehicle may drive in the future. In the case that the affected hardware capability is lower than the current hardware capability, it is determined that the hardware capability of the hardware will be restricted on the specific road section on which the vehicle may drive in the future, i.e., when the autonomous vehicle drives on a road section a specific distance away, the environmental factors of the road section will affect the hardware capability of the hardware.

Then, when the system determines that the hardware capability of the hardware will be restricted on the specific road section on which the vehicle may drive in the future, considering or based on environmental data, the method further evaluates the influence of the affected hardware capability of the hardware on the realization of required functions by the autonomous driving system. Specifically, the method judges whether the essential environmental factors are the essential and critical environmental factors on the future road section according to predefined rules. In the case that the essential environmental factors are the essential and critical environmental factors, the hardware capability of the hardware being restricted will negatively affect the realization of required functions by the autonomous driving system, and the confidence level of the autonomous driving system will decline, and the degree of the decline corresponds to the affected hardware capability of the hardware. If the method judges that the essential environmental factors are not the essential and critical environmental factors according to the predefined rules, it indicates that the essential environmental factors are essential but non-critical factors on the future road section. In this case, although the hardware capability of the hardware will be restricted, the restricted hardware capability will not negatively affect the realization of required functions of the autonomous driving system, and thus the confidence level of the autonomous driving system will not change or decline. In the example illustrated in FIG. 1, the method determines that the effectiveness of the function 3 will be changed after evaluating the affected hardware capability of the hardware 2 and then judging that the environmental factors are the essential and critical environmental factors. The method determines that the effectiveness of the function 3 will not be changed after evaluating the affected hardware capability of the hardware 2 and judging the environmental factors are the essential but non-critical environmental factors.

In addition, environmental data related to the non-essential but critical environmental factors on a specific road section is captured in real time through an automatic indexing technology and extracted in real time through a data processing and extraction technology. If the acquisition succeeds, it indicates that decisive factors which directly affect the realization of specific functions of the autonomous driving system exist on the future road section, and it is directly determined that the realization of required functions of the autonomous driving system will be negatively affected, and the confidence level of the autonomous driving system will decline. If the acquisition fails, it indicates that decisive factors which directly affect the realization of specific functions of the autonomous driving system do not exist on the future road section, and the method may continue judging the affected hardware capability on the road section and process the judgment result as described above.

Then, through an output device on the autonomous vehicle, relevant information indicating the confidence level of the autonomous driving system is output to the driver. The output device may be an in-vehicle device such as an HMI device in the vehicle or any other in-vehicle devices that can issue a prompt in a manner of displaying text, issuing an voice or issuing a sound, etc. to the driver. The relevant information regarding the confidence level of the autonomous driving system includes at least the confidence level of the autonomous driving system on the specific road section as converted from the affected hardware capability of the hardware, and pre-estimated time and distance needed to arrive at the specific road section.

In the following, the method and system of the present disclosure will be described in detail below by taking the automatic emergency braking function (hereinafter referred to as AEB function) as an example. It should also be understood that the following embodiments are merely intended to further illustrate the method and system of the present disclosure, and shall not be construed as limiting the scope of protection of the present disclosure. Some immaterial improvements and adjustments made by those skilled in the art in accordance with the aforesaid description of the present disclosure all fall within the scope of protection of the present disclosure. The following specific example process parameters are merely examples within an appropriate range, that is, those skilled in the art may make selections within an appropriate range by referring to the description herein, rather than being limited to the specific values in the following examples.

In the autonomous driving system, the same function may have multiple different system realization schemes, each of which will bring different functional characteristics and functional limitations to the function and may be specifically embodied as the hardware capability of the hardware. For example, the hardware capability of the hardware relates to the functional characteristics and functional limitations to a certain function. For example, for the AEB function, the millimeter wave radar sensing capability refers to the capability of sensing vehicles and fast-moving objects, the camera sensing capability refers to the capability of sensing pedestrians and slowly moving objects, the braking capability the vehicle braking system refers to the capability of moving over a distance during which the speed changes from the current speed to zero in a full capacity working mode, and the response capability of the control system refers to the capability of braking which is indicated by the time experienced from the time when an actual collision risk occurs to the time when the fully effective braking take place.

In the following examples, it is assumed that the autonomous vehicle is driving on a high-speed road at a cruising speed of 120 km/h and a scenario where the autonomous driving system using the vehicle sensors (i.e., hardware) to realize the AEB function is described in detail. To realize the AEB function, the vehicle sensors include at least a millimeter wave radar mainly used for sensing and recognizing vehicles and large targets, as well as a camera mainly used for sensing and recognizing pedestrians and slowly moving targets. Therefore, the realization of the AEB function may be further subdivided into the AEB function based on the camera only, the AEB function based on the millimeter wave radar only, or the AEB function based on the fusion or the combined use of the camera and the millimeter wave radar. For the AEB function based on the (not night vision) camera, essential environmental factors affecting the camera include, for example, illuminance, rainfall, fog, etc. For the AEB function based on the millimeter wave radar, essential environmental factors affecting the millimeter wave radar include, for example, dust storm, rainstorm, air humidity, etc. For the AEB function based on the fusion of the millimeter wave radar and the camera, the respective hardware shall be considered separately.

After the hardware used (i.e., the function realization scheme) is determined, the essential environmental factors affecting the hardware capability of the hardware may be determined according to predefined rules, and the relationships between the essential environmental parameters and the performance parameters of the hardware may be acquired, respectively. For example, in the system, the performance parameters regarding the sensing capability of the millimeter wave radar (hardware capability) may be predefined as maximum sensing distance, range resolution, ranging accuracy, maximum detection speed, speed resolution, speed measurement accuracy, detection field of view (FOV), angle resolution, angle measurement accuracy, target losing rate, etc., and the performance parameters regarding the sensing capability of the camera may be predefined as detection distance, horizontal field of view, vertical field of view, resolution, minimum illumination, dynamic range, target loss rate, detection accuracy, etc. Then, corresponding relationships between these performance parameters and the essential environmental factors are established. The corresponding relationships may be predefined in the system, which may vary according to the actual vehicle situations, and may be acquired through literature search or technical methods like test calibration.

Specifically, in the AEB function based on the fusion of the millimeter wave radar and the camera, the corresponding relationships between the hardware capability and the essential environmental parameters are established based on the specific hardware. In this case, for the camera, illumination is chosen as an essential environmental factor affecting the hardware capability of the camera (such as the capability of sensing and recognizing pedestrians and slowly moving targets). When the illuminance is 100~60000 lx, the performance of the camera (hardware capability) in sensing and recognition is 100%. When the illuminance is 50~100 lx, the performance of the camera in sensing and recognition is 60%. When the illuminance is more than 60000 lx, the performance of the camera in sensing and recognition is 0%. The corresponding relationship between the hardware capability of the millimeter wave radar and the essential environmental parameter is similar to the above in principle, which will not be repeated here.

Based on the automatic indexing technology (e.g., a general crawling technology, a focused crawling technology and an incremental crawling technology) and the data processing and extraction technology, essential environmental factors within a predefined range (such as an area 3 kilometers away or an area to be arrived at 30 minutes later) are acquired in real time through automatic indexing of a variety of information sources on the vehicle. Alternatively, it is possible to sense and acquire the essential environmental factors within the predefined range simultaneously or selectively based on roadside sensors and the V2X technology and convert the essential environmental factors acquired through automatic indexing or sensing into essential environmental parameters. For example, environmental data may be information data such as tunnel information, bridge information, basement information, mountain area information and altitude information based on vehicle maps, the longitude and latitude information data based on GPS, the information data such as rainfall, snow fog, temperature information and illumination based on weather forecasts, information data based on traffic and patrol police platforms, etc. In addition, the essential environmental parameters acquired through direct indexing include, for example, a slope (slope ratio) of 8% based on a map data source, a rainfall of 250 ml based on a weather forecast data source, a temperature of −15° C. based on a weather forecast data source, etc. In addition, the essential environmental parameters may be acquired through data processing and extraction. For example, essential environmental factors of "the rainfall is greater than 10 ml within 12 hours" and "the ambient temperature is lower than −0° C." acquired through direct indexing may be converted or extracted to essential environmental parameters of "the road surface may be icy, and the road friction coefficient may be lower than 0.2". Essential environmental factors such as rainfalls of a rainstorm, a heavy rainstorm, and a super heavy rainstorm as acquired through direct indexing may be converted or extracted to essential environmental parameters of "the visibility is 50 m, 30 m and 10 m, respectively" according to calibrated experiment results of a prior visibility matching based on a rainfall standard.

The hardware capability of the hardware is calculated according to the corresponding relationship between the essential environmental parameters and the performance parameters of the hardware. For example, if the system acquires or calculates that, at a road 3 km away, the illuminance is 70 lx, the performance of the camera in sensing and recognition is 60%, it is determined the hardware capability declines based on the calculation. Comparing the affected hardware capability with the current hardware capability or a specified threshold value indicates that the hardware capability of the hardware will be affected on a specific road section on which the vehicle may drive in the future. Comparing the affected hardware capability with the current hardware capability may indicate a relative decline of the capability compared with the current situation. And comparing the affected hardware capability with the specified threshold value may indicate an absolute decline of the capability compared with the standard.

When the hardware capability of the camera is restricted on the specific road section on which the vehicle may drive in the future, it does not necessarily mean that the realization of the system function is bound to be affected. In this case, the system performs further evaluation in consideration of the environmental data. Specifically, the system recognizes that, in the road 3 km away, the illuminance is 70 lx, and the performance of the camera in sensing and recognition is 60%. However, despite the affected hardware capability, since the camera is mainly used for sensing and recognizing pedestrians and slowly moving objects, the illuminance will not affect the system function under the influence of the environmental factors such as an expressway because there are no pedestrians on the expressway. As a result, this essential environmental factor becomes an essential but non-critical environmental factor. Therefore, it is comprehensively determined that the effectiveness of the AEB function of the system 3 km away is 100%.

As another example, it is assumed that the autonomous vehicle is driving on an expressway at a cruising speed of 120 km/h, the system senses in real time that the weather forecast rainfall information 3 km away from the driving route of the vehicle is a super heavy rainstorm. The system judges that the visibility of the super heavy rainstorm is 10 m and the rainfall is greater than 250 ml. The system recognizes in real time that the visibility will affect the sensing distance of the camera, and calculates that the effective sensing distance of the camera is 15 m. And the system recognizes in real time that the rainfall will affect the sensing distance of the millimeter wave radar, and calculates that the effective sensing distance of the millimeter wave radar is 350 m.

In this example, system pre-defines the minimum performance threshold values for the hardware capabilities as follows. When the vehicle speed is 60 km/h, the minimum sensing distance of the camera should be 10 m in order to avoid collisions with pedestrians, and the minimum sensing distance of the millimeter wave radar should be 100 m in order to avoid collisions with vehicles. When the vehicle speed is 100 km/h, the minimum sensing distance camera should be 20 m in order to avoid collisions with pedestrians, and the minimum sensing distance of the millimeter wave radar should be 200 m in order to avoid collisions with vehicles. When the vehicle speed is 120 km/h, the minimum sensing distance of the camera should be 30 m in order to avoid collisions with pedestrians, and the minimum sensing distance of the millimeter wave radar should be 300 m in order to avoid collisions with vehicles.

Considering the effective sensing distances of the camera and the radar (i.e., affected hardware capabilities) obtained from the calculation, the predefined minimum performance threshold values and the vehicle operation status parameters acquired in real time, the system determines that the sensing distance of the camera and the sensing distance radar of the AEB function will be impaired (the hardware capabilities will be affected) after the autonomous vehicle runs 3 km, which affects the effective recognition of pedestrians and vehicle targets, respectively. Considering that the actual traffic lane environment after driving a distance of 3 km is an expressway, and there are no pedestrians on the road, but the speeds of surrounding vehicles are high and the traffic is relatively heavy, the system determines that the camera's hardware capability being impaired will not affect the realization of the AEB function, but the millimeter wave radar's hardware capability being impaired will affect the realization of the AEB function, and thus comprehensively determines that the confidence level system will decline when the vehicle runs on the road section 3 km away. Thereby, the system prompts the driver through an output device that the confidence level of the collision risk avoidance function of the vehicle on the road section 3 km away is insufficient and alert the driver to pay more attention. Alternatively, if a plurality of routes are available, while comprehensively determining that the confidence level of the system will decline at the time of driving on the predetermined road section, the system prompts the driver to switch to another route with a higher confidence level, or prompt the driver a route with the highest confidence level among the plurality of routes. Here, the hardware capability being impaired will not necessarily affect the realization of the function, but the function realization being impaired will be reflected/indicated as the decline of the confidence level of the autonomous driving system in terms of the function. Each function's confidence level may also be fused into the autonomous driving system's overall confidence level by being multiplied with a weight ratio, but the method to determine the overall confidence level is not limited to this example.

Based on the above, the method and system of the present disclosure determines the influence of environmental factors on hardware capability, and deduces the influence of the hardware capability on the system function by considering the environmental factors again, and so on. Considering the environmental factors, the method and system of the present disclosure respectively calculates and judges the influence of respective hardware capability of the hardware on the functions of the system to judge the effectiveness of each function of the system, and further acquires the confidence level of the autonomous driving system on a future road section and prompts the confidence level to the driver, which has a very high timeliness and accuracy, and enables the driver to know in advance the coping capability or performance of the vehicle on the future road section, enhancing the human-vehicle interaction and improving the driving experience.

The method to identify or determine a confidence level of an autonomous driving system as described above may be implemented in an autonomous driving system. In one aspect, the autonomous driving system comprise one or more processors and one or more memories for storing instructions; a plurality of hardware to realize certain functions of autonomous driving system, wherein the instructions, when being executed by the processors, cause the autonomous driving system to perform the following steps:

determining hardware used by the autonomous driving system currently to realize required functions and essential environmental factors which affect hardware capability, and establishing a relationship between the hardware capability and the essential environmental factors;

based on environmental factors on a specific road section in the future acquired in real time, calculating a degree to which the hardware capability will be affected on the specific road section in the future according to the established relationship, wherein the environmental factors on the specific road section in the future include at least essential environmental factors, and wherein the essential environmental factors include essential and critical environmental factors and essential but non-critical environmental factors, wherein the essential and critical environmental factors affect realization of required functions of the autonomous driving system, and the essential but non-critical environmental factors do not affect the realization of required functions of the autonomous driving system;

in considering the affected hardware capability obtained from the above calculation, and in combination of consideration of the essential and critical environmental factors among the environmental factors on the specific road section in the future acquired in real time, determining an influence of the affected hardware capability on the realization of required functions of the autonomous driving system; and indicating the influence on the realization of required functions autonomous driving system as a confidence level of the autonomous driving system to prompt the confidence level to a driver.

In some embodiments, the steps implemented in the above autonomous driving system comprise acquiring the environmental factors in real time through an automatic indexing technology and/or a data processing and extraction technology.

In yet another aspect, an autonomous vehicle is provided. The autonomous vehicle comprises the autonomous driving system of the present disclosure as described above.

In yet another aspect, a controller is provided. The controller is used in an autonomous driving system of the present disclosure. The controller comprises a memory and a processor, wherein the memory stores at least one instruction, at least one program, a code set or an instruction set, which are loaded and executed by the processor to perform the method for identifying a confidence level of an autonomous driving system as described above.

In yet another aspect, a non-transitory computer readable storage medium is provided. The storage medium stores at least one instruction, at least one program, a code set or an instruction set which are loaded and executed by a processor to carry out the method for identifying a confidence level of an autonomous driving system in an autonomous vehicle as described above.

The above specific embodiments further expound the objective, technical solutions and beneficial effects of the present invention. It should be understood that the above is merely a specific embodiment of the present invention and is not intended to limit the scope of protection of the present invention. The present invention may be embodied in various forms without departing from the spirit of the basic features present invention. Therefore, the embodiments of the present invention are for illustration rather than limitation. The scope of the present invention is defined by the claims instead of the description. And all variations falling within the scope defined by the claims or an equivalent scope thereof shall be construed to be included in the claims. Any modifications, equivalent replacements, improvements, etc. made within the spirit and principles of the present invention shall be included in the scope of protection of the present invention.

What is claimed is:

1. A method for identifying a confidence level of an autonomous driving system while a vehicle is driving, the method comprising:

determining, by a controller, a realization scheme used by the autonomous driving system to realize a required function of the autonomous driving system on a future specific road section wherein the required function comprises one of an adaptive cruise control function, a lane keeping assist function, and an autonomous driving emergency braking function;

determining hardware used to realize the required function and essential environmental factors, and establishing a relationship between hardware capability of the hardware and the essential environmental factors, wherein the essential environmental factors affect the hardware capability of the hardware, and are classified into essential and critical environmental factors, and essential but non-critical environmental factors, wherein the essential and critical environmental factors affect realization of the required function of the autonomous driving system, and wherein the essential but non-critical environmental factors do not affect the realization of the required function of the autonomous driving system;

acquiring environmental factors on the future specific road section in real time through an automatic indexing technology and/or a data processing and extraction technology;

calculating a degree to which the hardware capability of the hardware will be affected on the future specific road section according to the established relationship based on the acquired environmental factors, wherein the acquired environmental factors include at least essential environmental factors;

in consideration of affected hardware capability of the hardware obtained from the calculation, and in consideration of, among the environmental factors on the future specific road section acquired in real time, the essential and critical environmental factors, determining an influence on the realization of the required function of the autonomous driving system on the future specific road section;

reflecting the influence on the realization of the required function of the autonomous driving system as a confidence level of the autonomous driving system, wherein the confidence level of the autonomous driving system comprises one of a confidence level of the adaptive cruise control function, a confidence level of lane keeping assistance function, and a confidence level of the autonomous driving emergency braking function;

outputting relevant information indicating the confidence level to a driver via an output device on an autonomous vehicle, wherein the output device is configured to issue the relevant information indicating the confidence level by displaying text, issuing a voice, or issuing a sound; and issuing instructions to the driver via the output device, wherein the instructions recommend that the driver switch to a different route with a higher confidence level.

2. The method for identifying the confidence level of the autonomous driving system in accordance with claim 1, further comprising:

determining non-essential environmental factors, wherein the non-essential environmental factors do not affect the hardware capability of the hardware, and are classified into non-essential but critical environmental factors and non-essential and non-critical environmental factors, wherein the non-essential but critical environmental factors affect the realization of the required function of the autonomous driving system and the non-essential and non-critical environmental factors do not affect the realization of the required function of the autonomous driving system; and in response to the non-essential but critical environmental factors existing in the environmental factors on the future specific road section acquired in real time, determining that the realization of the required function is negatively affected, and the confidence level of the autonomous driving system is decreased.

3. The method for identifying the confidence level of the autonomous driving system in accordance with claim 1, wherein the environmental factors acquired in real time include at least essential environmental parameters which are directly used for calculation of the hardware capability of the hardware, and essential environmental factors which are used for the calculation only after being processed and converted into essential environmental parameters.

4. The method for identifying the confidence level of the autonomous driving system in accordance with claim 3, further comprising:

determining and establishing corresponding relationships between performance parameters reflecting the hardware capability of the one or more hardware and essential environmental parameters reflecting the essential environmental factors.

5. The method for identifying the confidence level of the autonomous driving system in accordance with claim 4, further comprising:

based on the essential environmental parameters acquired directly and the essential environmental parameters acquired after processing the essential environmental factors, calculating the performance parameters of the hardware, respectively according to the corresponding relationships, and determining the affected hardware capability of the hardware based on the performance parameters of the hardware.

6. The method for identifying the confidence level of the autonomous driving system in accordance with claim 5, further comprising:

comparing the affected hardware capability of the hardware with current hardware capability of the hardware or a specified threshold value;

in response to the affected hardware capability being above the current hardware capability or above the specified threshold value, determining that the hardware capability of the hardware will not be affected on the future specific road section; and in response to the affected hardware capability being lower than the current hardware capability or lower than the specified threshold value, determining that the hardware capability of the hardware will be restricted on the future specific road section.

7. The method for identifying the confidence level of the autonomous driving system in accordance with claim 6, wherein when the hardware capability of the hardware will be restricted on the future specific road section, considering the environmental factors, in consideration of the environmental factors, making the following determination: in response to the essential environmental factors being the essential and critical environmental factors, determining that the hardware capability being restricted will negatively affect the realization of the required function of the autonomous driving system, and the confidence level of the autonomous driving system will decline, and a degree of the decline corresponds to the affected hardware capability of the hardware; and in response to the essential environmental factors being the essential but non-critical environmental factors, determining the hardware capability being restricted will not negatively affect the realization of the required function of the autonomous driving system, and the confidence level of the autonomous driving system will not decline.

8. The method for identifying the confidence level of the autonomous driving system in accordance with claim 1, wherein the relevant information indicating that the confidence level of the autonomous driving system includes at least the confidence level of the autonomous driving system on the future specific road section, and pre-estimated time and distance needed to arrive at the future specific road section, the method further comprising:

alerting the driver to pay attention in the case that the confidence level of the adaptive cruise control function, the confidence level of lane keeping assistance function, or the confidence level of the autonomous driving emergency braking function decreases to a preset threshold.

9. The method for identifying the confidence level of the autonomous driving system in accordance with claim 1, wherein the relevant information indicating the confidence level includes a coping capability of the autonomous driving system on the future specific road section.

10. The method for identifying the confidence level of the autonomous driving system in accordance with claim 1, further comprising: issuing an alert to the driver via the output device based on a coping capability of the autonomous driving system decreasing on the future specific road section.

11. An autonomous driving system capable of identifying a confidence level of the autonomous driving system, the autonomous driving system comprising one or more processors and one or more memories for storing instructions, wherein the instructions, when being executed by the one or more processors, cause the autonomous driving system to perform the following operations while a vehicle is driving:

determining, by a controller, a realization scheme used by the autonomous driving system to realize a required function of the autonomous driving system on a future specific road section, wherein the required function comprises one of an adaptive cruise control function, a lane keeping assist function, and an autonomous driving emergency braking function;

determining hardware used to realize the required function and essential environmental factors, and establishing a relationship between hardware capability of the hardware and the essential environmental factors, wherein the essential environmental factors affect the hardware capability of the hardware, and are classified into essential and critical environmental factors, and essential but non-critical environmental factors, wherein the essential and critical environmental factors affect realization of the required function of the autonomous driving system, and wherein the essential but non-critical environmental factors do not affect the realization of the required function of the autonomous driving system;

acquiring environmental factors on the future specific road section in real time through an automatic indexing technology and/or a data processing and extraction technology;

calculating a degree to which the hardware capability of the hardware will be affected on the future specific road section according to the established relationship based on the acquired environmental factors, wherein the acquired environmental factors include at least essential environmental factors;

in consideration of affected hardware capability of the hardware obtained from the above calculation and in consideration of, among environmental factors on the future specific road section acquired in real time, essential and critical environmental factors, determining an influence on the realization of the required function of the autonomous driving system on the future specific road section;

reflecting the influence on the realization of the required function of the autonomous driving system as a confidence level of the autonomous driving system on the future specific road section, wherein the confidence level of the autonomous driving system comprises one of a confidence level of the adaptive cruise control function, a confidence level of lane keeping assistance function, and a confidence level of the autonomous driving emergency braking function;

outputting relevant information indicating the confidence level to a driver via an output device on an autonomous vehicle; and issuing instructions to the driver via the output device, wherein the instructions recommend that the driver switch to a different route with a higher confidence level.

12. A controller, comprising a memory and a processor, wherein the memory stores at least one instruction, at least one program, a code set or an instruction set, which are loaded and executed by the processor to perform the following method for identifying a confidence level of an autonomous driving system in an autonomous vehicle while the autonomous vehicle is driving:

determining, by a controller, a realization scheme used by the autonomous driving system to realize a required function of the autonomous driving system on a future specific road section wherein the required function comprises one of an adaptive cruise control function, a lane keeping assist function, and an autonomous driving emergency braking function;

determining hardware used to realize the required function and essential environmental factors, and establishing a relationship between hardware capability of the hardware and the essential environmental factors, wherein the essential environmental factors affect the hardware capability of the hardware and are classified into essential and critical environmental factors, and essential but non-critical environmental factors, wherein the essential and critical environmental factors affect realization of the required function of the autonomous driving system, and wherein the essential but non-critical environmental factors do not affect the realization of the required function of the autonomous driving system;

acquiring environmental factors on the future specific road section in real time through an automatic indexing technology and/or a data processing and extraction technology;

calculating a degree to which the hardware capability of the hardware will be affected on the future specific road section according to an established relationship based on the acquired environmental factors, wherein the acquired environmental factors include at least the essential environmental factors;

in consideration of affected hardware capability of the hardware obtained from the calculation, and in consideration of, among the environmental factors on the future specific road section acquired in real time, the essential and critical environmental factors, determining an influence on the realization of the required function of the autonomous driving system on the future specific road section;

reflecting the influence on the realization of the required function of the autonomous driving system as a confidence level of the autonomous driving system, wherein the confidence level of the autonomous driving system comprises one of a confidence level of the adaptive cruise control function, a confidence level of lane keeping assistance function, and a confidence level of the autonomous driving emergency braking function;

outputting relevant information indicating the confidence level to a driver via an output device on the autonomous vehicle; and issuing instructions to the driver via the output device, wherein the instructions recommend that the driver switch to a different route with a higher confidence level.

13. The controller in accordance with claim 12, wherein the method performed by the processor further comprising:

determining non-essential environmental factors which do not affect the hardware capability of the hardware, wherein the non-essential environmental factors do not affect the hardware capability of the hardware, and are classified into non-essential but critical environmental factors and non-essential and non-critical environmental factors, wherein the non-essential but critical environmental factors affect the realization of the required function of the autonomous driving system and the non-essential and non-critical environmental factors do not affect the realization of the required function of the autonomous driving system; and in response to the non-essential but critical environmental factors existing in the environmental factors on the future specific road section acquired in real time, determining that the realization of the required function is negatively affected, and the confidence level of the autonomous driving system is decreased.

14. The controller in accordance with claim 12, wherein the environmental factors acquired in real time include at least essential environmental parameters which are directly used for calculation of the hardware capability of the hardware, and essential environmental factors which are used for the calculation only after being processed and converted into essential environmental parameters.

15. The controller in accordance with claim 14, wherein the method performed by the processor further comprising:

determining and establishing corresponding relationships between performance parameters reflecting the hardware capability of the hardware and essential environmental parameters reflecting the essential environmental factors.

16. The controller in accordance with claim 15, wherein the method performed by the processor further comprising:

based on the essential environmental parameters acquired directly and the essential environmental parameters acquired after processing the essential environmental factors, calculating the performance parameters of the hardware, respectively according to the corresponding relationships, and determining the affected hardware capability of the hardware based on the performance parameters of the hardware.

17. The controller in accordance with claim 16, wherein the method performed by the processor further comprising:

comparing the affected hardware capability of the hardware with current hardware capability of the hardware or a specified threshold value;

in response to the affected hardware capability being above the current hardware capability or above the specified threshold value, determining that the hardware capability of the hardware will not be affected on the future specific road section; and in response to the affected hardware capability being lower than the current hardware capability or lower than the specified threshold value, determining that the hardware capability of the hardware will be restricted on the future specific road section.

18. The controller in accordance with claim 17, wherein the method performed by the processor further comprising:

when the hardware capability of the hardware will be restricted on the future specific road section, in consideration of the environmental factors, making the following determination: in response to the essential environmental factors being the essential and critical environmental factors, determining that the hardware capability being restricted will negatively affect the realization of the required function of the autonomous driving system, and the confidence level of the autonomous driving system will decrease, and a degree of the decrease corresponds to the affected hardware capability of the hardware; and in response to the essential environmental factors being the essential but non-critical environmental factors, determining the hardware capability being restricted will not negatively affect the realization of the required function of the autonomous driving system, and the confidence level of the autonomous driving system will not decrease.

19. The controller in accordance with claim 12, wherein the relevant information indicating that the confidence level of the autonomous driving system includes pre-estimated time and distance needed to arrive at the future specific road section, the method further comprising:

alerting the driver to pay attention in the case that the confidence level decreases to a preset threshold.

20. A non-transitory computer readable storage medium, wherein the storage medium stores at least one instruction, at least one program, a code set or an instruction set which are loaded and executed by a processor to perform the following method for identifying a confidence level of an autonomous driving system in an autonomous vehicle:

determining, by a controller, a realization scheme used by the autonomous driving system to realize a required function of the autonomous driving system on a future specific road section wherein the required function comprises one of an adaptive cruise control function, a lane keeping assist function, and an autonomous driving emergency braking function;

determining hardware used to realize the required function and essential environmental factors, and establishing a relationship between hardware capability of the hardware and the essential environmental factors wherein the essential environmental factors affect the hardware capability of the hardware and are classified into essential and critical environmental factors, and essential but non-critical environmental factors, wherein the essential and critical environmental factors affect realization of the required function of the autonomous driving system, and wherein the essential but non-critical environmental factors do not affect the realization of the required function of the autonomous driving system;

acquiring environmental factors on the future specific road section in real time through an automatic indexing technology and/or a data processing and extraction technology;

calculating a degree to which the hardware capability of the hardware will be affected on the future specific road section according to an established relationship based on the acquired environmental factors, wherein the acquired environmental factors include at least the essential environmental factors;

in consideration of affected hardware capability of the hardware obtained from the calculation, and in consideration of, among the environmental factors on the future specific road section acquired in real time, the essential and critical environmental factors, determining an influence on the realization of the required function of the autonomous driving system on the future specific road section;

reflecting the influence on the realization of the required function of the autonomous driving system as a confidence level of the autonomous driving system on the future specific road section, wherein the confidence level of the autonomous driving system comprises one of a confidence level of the adaptive cruise control function, a confidence level of lane keeping assistance function, and a confidence level of the autonomous driving emergency braking function;

outputting relevant information indicating the confidence level to a driver via an output device on the autonomous vehicle; and issuing instructions to the driver via the output device, wherein the instructions recommend that the driver switch to a different route with a higher confidence level.

* * * * *